April 14, 1959  J. W. COX  2,881,679
PULP MOLDING MACHINE
Filed Jan. 16, 1952  10 Sheets-Sheet 1

INVENTOR.
John W. Cox,
BY
Cromwell, Greist + Warden
Attys.

April 14, 1959   J. W. COX   2,881,679
PULP MOLDING MACHINE
Filed Jan. 16, 1952   10 Sheets-Sheet 3

INVENTOR.
John W. Cox,
BY
Cromwell, Greist & Warden
Attys.

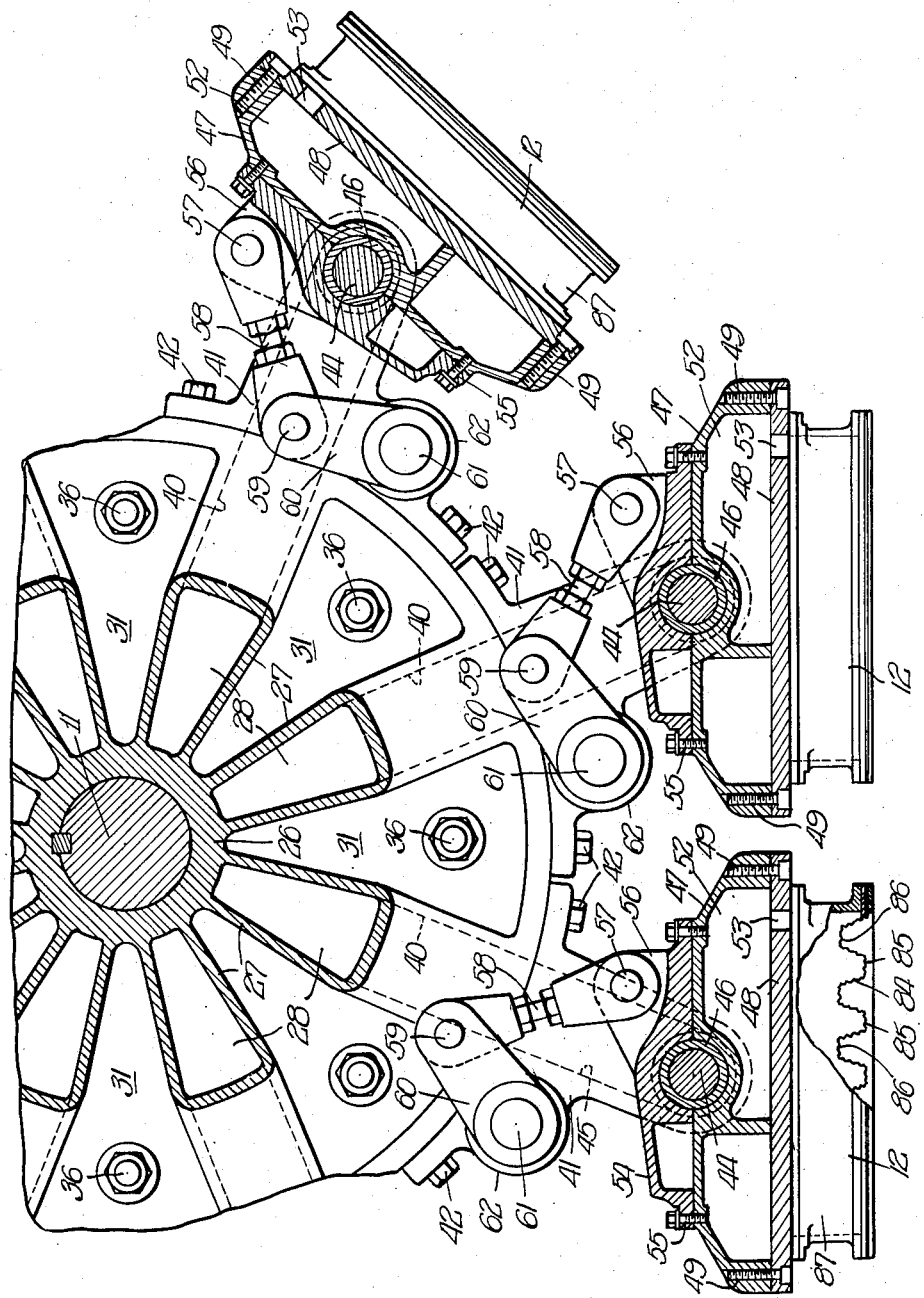

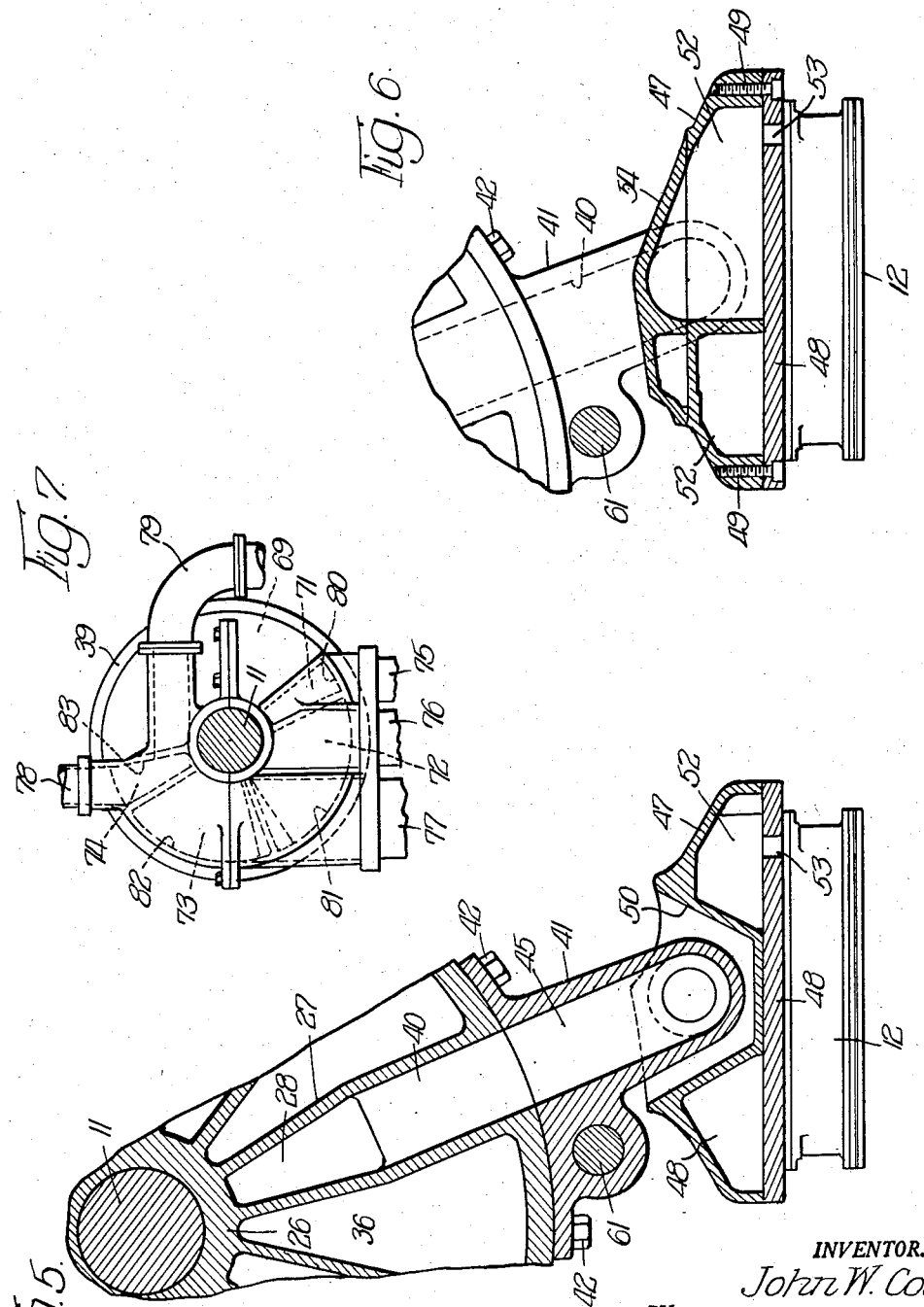

April 14, 1959  J. W. COX  2,881,679
PULP MOLDING MACHINE
Filed Jan. 16, 1952  10 Sheets-Sheet 6

INVENTOR.
John W. Cox,
BY
Cromwell, Greist & Warden
Attys.

April 14, 1959 J. W. COX 2,881,679
PULP MOLDING MACHINE
Filed Jan. 16, 1952 10 Sheets-Sheet 7
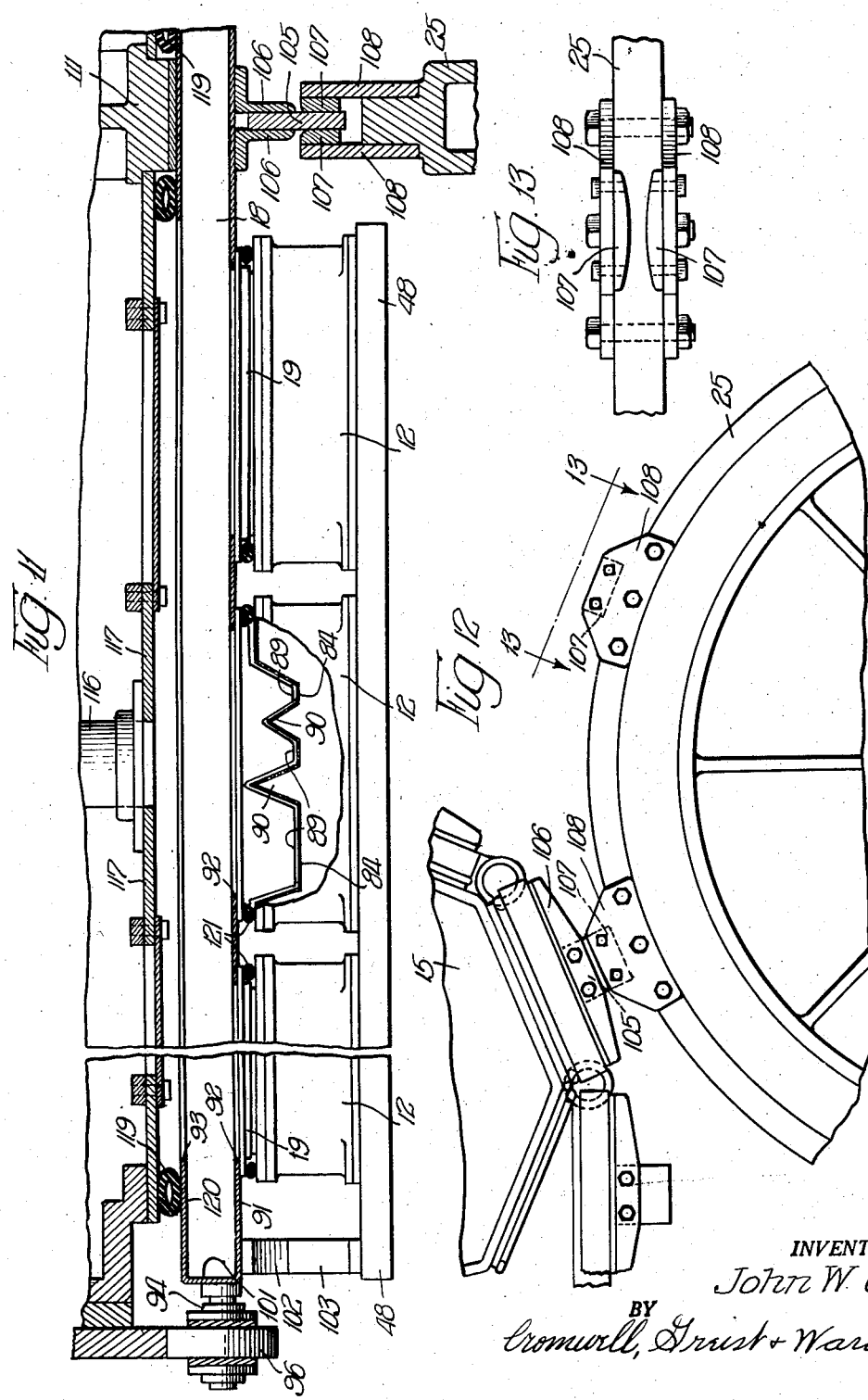
INVENTOR.
John W. Cox,
BY
Cromwell, Greist & Warden
Attys.

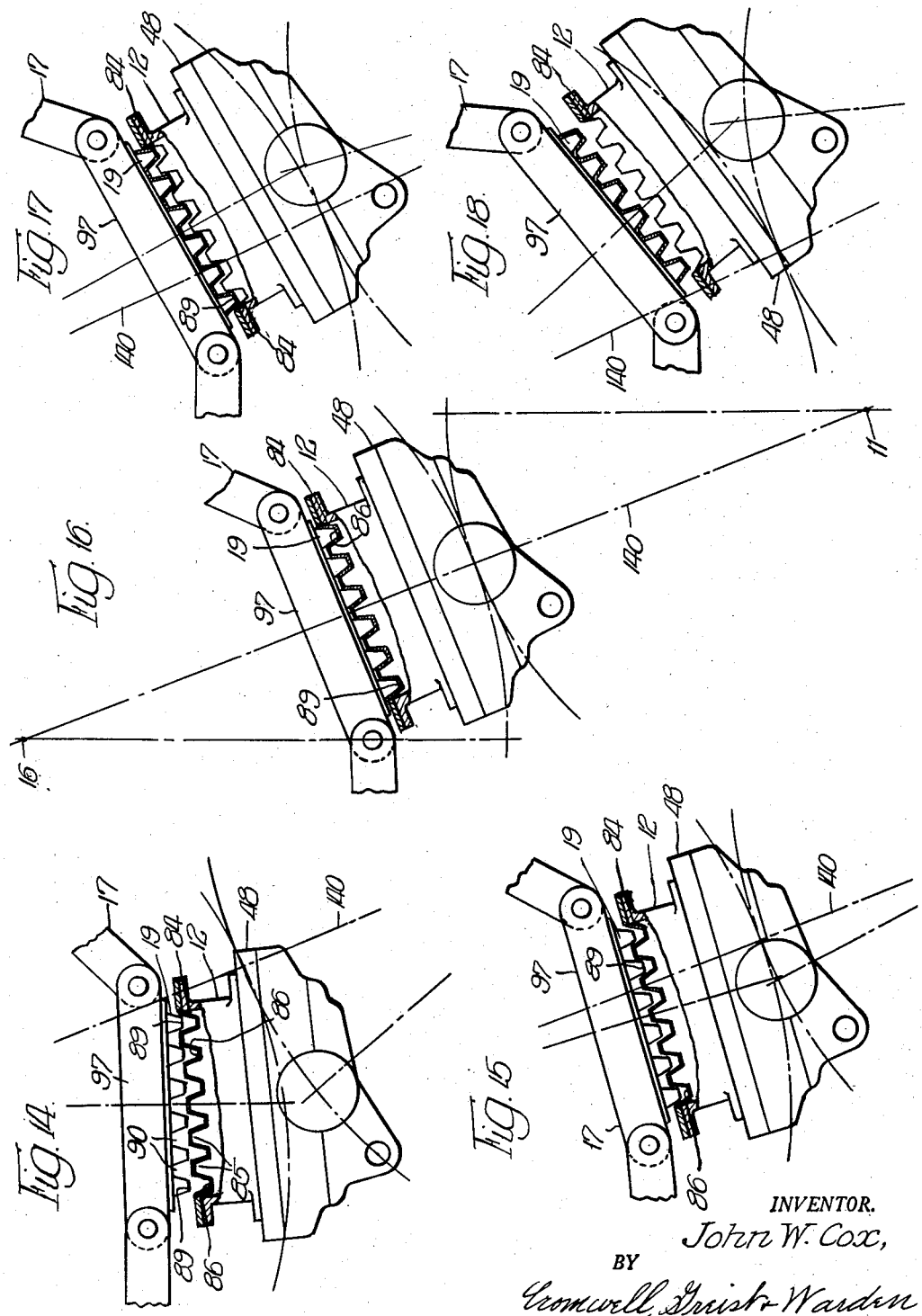

April 14, 1959  J. W. COX  2,881,679
PULP MOLDING MACHINE
Filed Jan. 16, 1952  10 Sheets-Sheet 9
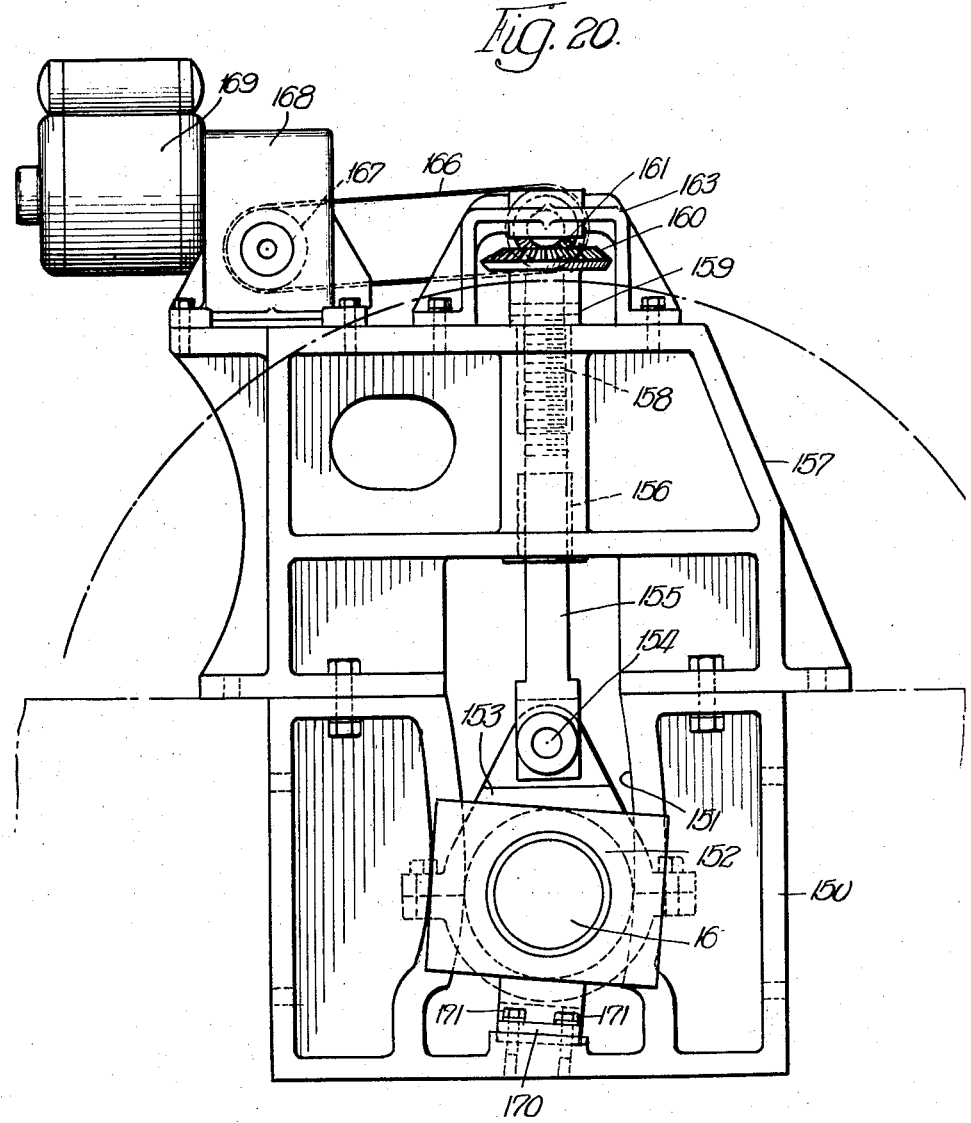
INVENTOR.
John W. Cox,
BY
Cromwell, Greist & Warden
attys.

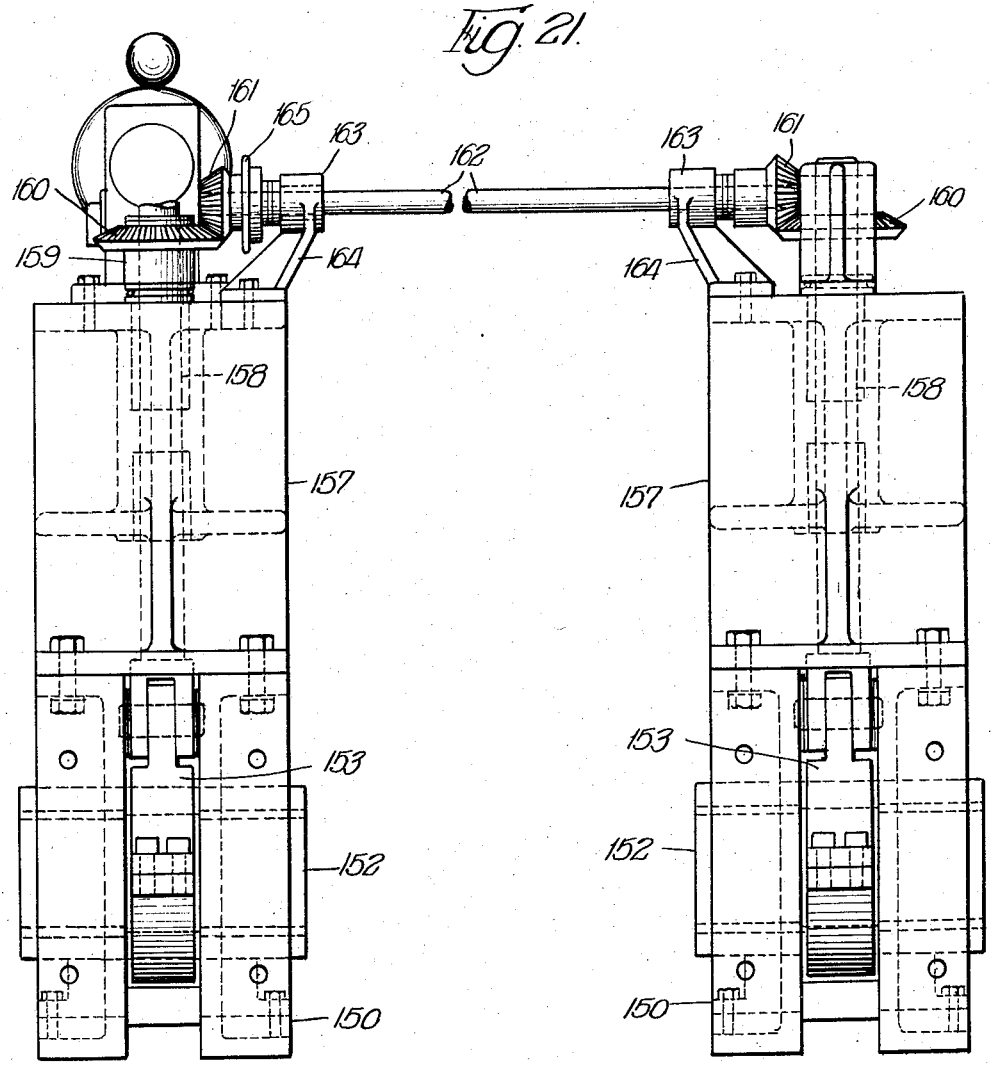

United States Patent Office 2,881,679
Patented Apr. 14, 1959

2,881,679

PULP MOLDING MACHINE

John W. Cox, Chicago, Ill., assignor, by mesne assignments, to Diamond Gardner Corporation, a corporation of Delaware Application January 16, 1952, Serial No. 266,749

14 Claims. (Cl. 92—57)

This invention relates to a machine for forming molded pulp articles, and is more particularly concerned with improvements in mechanism by means of which a series of molded pulp articles are formed on continuously moving dies and thereafter transferred to a series of interconnected continuously moving drying forms, complementary in shape to the forming dies, which carry the articles through a drying oven.

In the molded pulp field the mechanism employed for the molding operation comprises a rotating carrier, provided with a series of foraminous dies, each contoured to provide the desired shape for the article being molded, which dies are moved successively into a vat filled with a quantity of liquid pulp material and immersed for a sufficient length of time to permit formation thereon of a layer of the pulp, by means of suction through the dies. Thereafter the soft, wet shaped pulp articles are subjected to drying and finishing operations in the course of which they are removed from the forming dies. The two principal methods of drying are: (1) loose drying wherein the molded articles are removed from the forming dies while still wet and carried unconfined through an oven on a wire belt conveyor, and (2) form drying wherein the wet molded articles are transferred from the forming dies to shaped drying forms on a conveyor and carried through the drying oven on the shaped forms. The latter drying method produces a more uniform article than the former and is preferable from many standpoints. However, in this latter method as heretofore practiced, it has been necessary to stop the machine in order to effect transfer of the articles from the forming dies to the drying forms, thus reducing the output of the machine.

The primary object of the present invention is to provide a method and mechanism for supporting a series of molding dies on a continuously rotating carrier which moves the dies through the pulp material, and thereafter transferring the wet pulp articles from the forming dies to rigid drying forms of complementary shape which are mounted on a continuously traveling endless conveyor which carries the articles through the drying oven on the drying forms, the molding and transfer operations being accomplished without stopping or slowing down either the die supporting carrier or the form carrying conveyor, resulting in higher production and less waste.

Another object of the invention is to provide a pulp molding mechanism comprising a drying form conveyor having marginal end supporting sprockets each carrying a chain made up of relatively long links, a series of drying forms mounted on transverse frames which are connected to corresponding chain links on opposite sides of the conveyor, a rotary forming unit having pivoted thereon a series of forming dies arranged to correspond to the drying forms, and means for pivoting the forming dies into mating relation with the drying forms after the drying form frames have been engaged through the chain links with the marginal sprockets.

Still another object of the invention is to provide a pulp molding machine having a pair of transversely spaced endless conveyor chains carrying a procession of transverse frames upon which are mounted rigid drying forms, the chains passing from a lower horizontal return flight upwardly about end supporting sprockets and through a drying oven, the sprockets being positioned outboard of forming dies which are pivotally mounted on a lower rotary forming unit, the dies being pivoted at a point on the forming unit where radii struck from the centers of the shafts of the forming unit and the sprockets multiplied by their respective r.p.m. produce an equal number, the molding dies being movable into and through spaced parallel transfer relation with the drying forms as the radii are aligned through the pivot point whereby a molded article may be jumped across from the forming die to the drying form by air pressure and suction, with additional means being provided, if desired, to prevent accidental engagement of the drying forms and forming dies during the transfer period.

A further object of the invention is to construct a pulp molding mechanism of the type described wherein the shafts of the chain carrying sprockets and the die carrying forming unit extend transversely of the machine and are arranged in parallel relation with the forming unit shaft positioned ahead of and below the sprocket shaft, the chain links being engaged and rigidly held at both ends on the sprockets as the forming dies and drying forms move into parallel relation, whereby transfer of articles from the dies to the forms is made at the point where the sprockets impart the greatest rigidity on the chain due to initial engagement and pull thereon.

It is another important object of the invention to provide a mechanism for molding pulp articles wherein there is provided a rotary molding wheel having a plurality of pivotally mounted forming dies arranged around the periphery thereof and a container for the liquid pulp material which is so positioned that successive forming dies are carried into and out of the same to deposit a layer of the pulp on the molding face of each die, means being provided for controlling the pivotal movement of the dies to position each successive die with its molding face in a plane substantially parallel to the plane of the top surface of the liquid pulp material as it moves into and out of the material whereby to obtain a pulp layer of uniform thickness throughout the entire area of the molding face.

It is another object of the invention to provide a pulp molding machine comprising a transverse series of hollow forming dies pivotally mounted on the periphery of a rotatable molding wheel having internal passageways connecting the interior of the dies with suction and blowoff lines, which passageways extend through the pivotal die mountings and through the molding wheel.

A further object is the provision in a pulp molding machine of a stock tank and a rotary forming unit having one or more forming dies which are movable through an orbit into and out of the stock tank, the dies being pivoted at a point on the forming unit which moves in a path above the level of the liquid in the stock tank.

Another object is to provide a pulp molding machine having a plurality of laterally spaced stock tanks, a forming unit having laterally spaced series of rotary forming dies arranged to correspond to the spacing of the stock tanks, a conveyor above the forming unit having mounted thereon cross frames carrying drying forms spaced to correspond with the spacing of the forming dies, the latter being pivotally mounted and movable into mating relation with the drying forms and a centering device on the frames and unit at a point between the transversely spaced series of forming dies.

These and other objects of the invention will be apparent from a consideration of the molding apparatus which is shown by way of illustration in the accompanying drawings, wherein:

Fig. 4 is a partial section taken on the line 4—4 of Fig. 3, to an enlarged scale;

Fig. 5 is a fragmentary section taken on the line 5—5 of Fig. 3, to an enlarged scale;

Fig. 6 is a fragmentary section taken on line 6—6 of Fig. 3, to an enlarged scale;

Fig. 7 is a section taken on line 7—7 of Fig. 2;

Fig. 11 is a partial section taken on the line 2—2 of Fig. 1, to an enlarged scale, showing portions of the conveyor sprocket formation and drying forms;

Fig. 12 is a partial section on the line 12—12 of Fig. 2;

Fig. 13 is a detail view taken on the line 13—13 of Fig. 12;

Figs. 14 to 18 are detail views showing relative positions of the molding die and drying form as they move into and out of parallel article transfer relation;

Fig. 20 is a side elevation showing the mounting frame for the conveyor end sprocket formation; and Fig. 21 is a view transversely of the machine showing the mounting frame for the conveyor end sprocket formation in end elevation.

The drawings illustrate the forming or molding end of a pulp molding machine which incorporates therein the principal features of the invention and which is particularly adapted for use in the manufacture of a relatively deep molded pulp article such as an egg carton requiring a forming die which has projecting portions of substantial size separated by relatively deep valleys or recesses.

Figure 2:
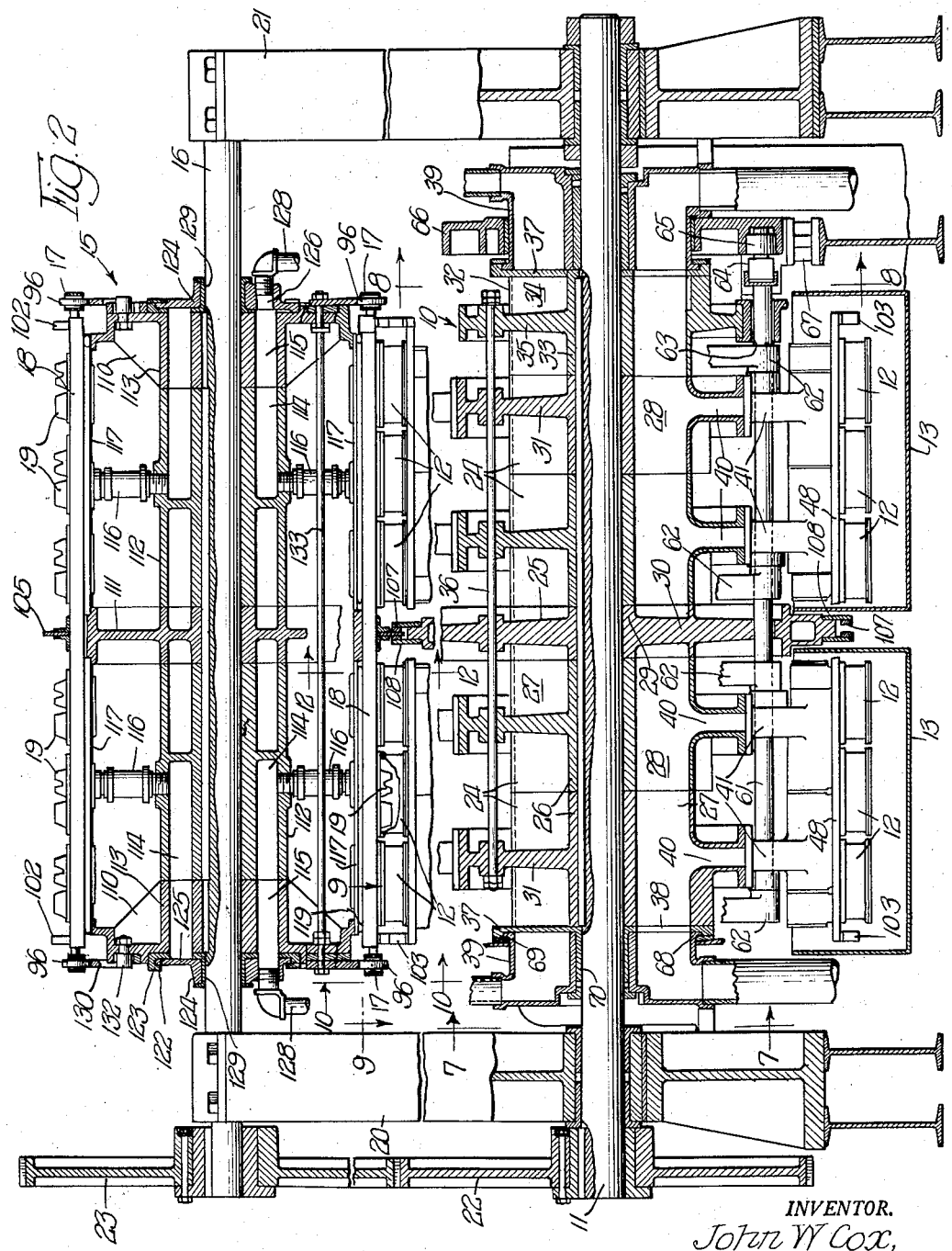
Fig. 2 is a section taken generally on the lines 2—2 of Fig. 1 and extending axially of the molding cylinder and the associated conveyor sprocket formation, with portions broken away.

The molding section of the machine is built around a cylinder 10 rotatably supported on a horizontal shaft 11 and having eight transverse sets of forming dies 12 arranged about it. As shown in Fig. 2, each of these transverse series of dies 12 include six dies arranged three on a side so as to leave a space between the center dies. Clockwise rotation of the shaft 11 brings each transverse series of dies 12 successively into and through two transversely spaced stock tanks 13 containing the usual light slurry 14 of pulp fibers suspended in water, suction being provided for the dies 12 to deposit the molded pulp article on the conventional die screen.

Above the molding section is positioned a drying section to which the the wet pulp articles are transferred in the same transverse series relation as they are formed. This drying section includes two eight-sided sprockets 15 mounted on shaft 16, one on each side of the machine above the molding cylinder and outboard of the molding dies 12. The sprockets 15 carry endless conveyor chains 17 between which are mounted rigid transverse drying frames 18. Upon the latter are mounted transverse series of drying forms 19 shaped to fit the inside of the article being formed and arranged to receive these articles as the forming dies 12 rotate in adjacent position, as will be described, and to convey the articles through a drying oven.

The shaft 11 of the cylinder 10 is journaled in laterally spaced side plates 20 and 21 which are positioned outboard of sprockets 15. Adjacent frame 20 shaft 11 carries a drive gear 22 which meshes with a similar gear 23 mounted on shaft 16 so that the molding section and drying section may be driven in synchronized relation.

Figure 3:
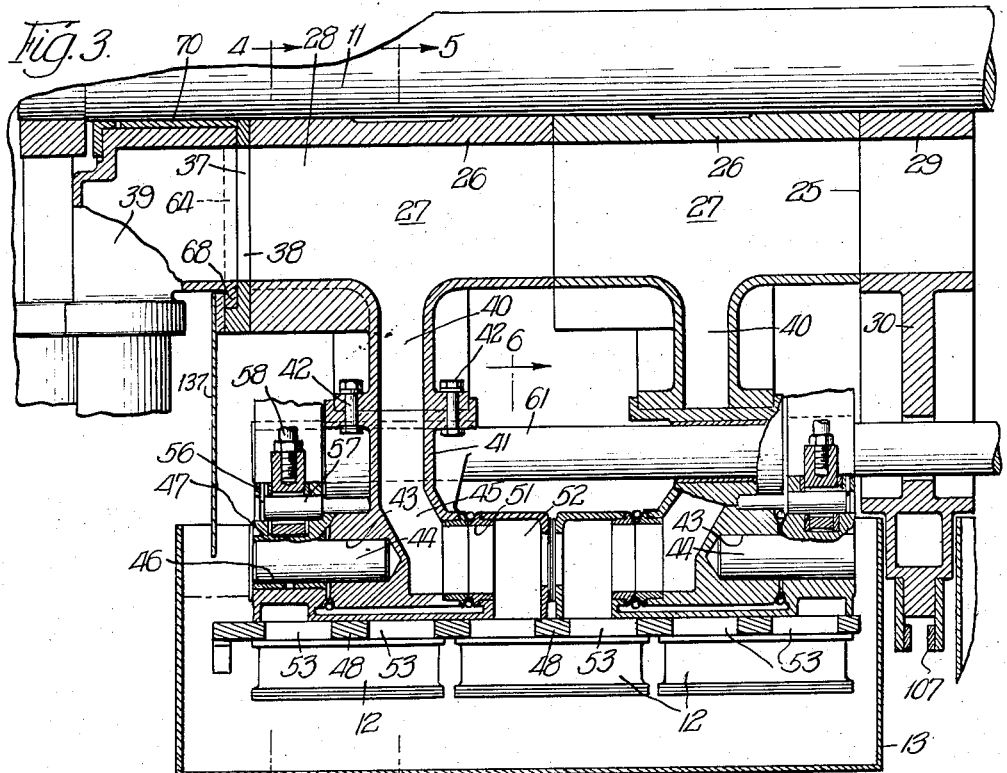
Fig. 3 is a partial section on the line 3—3 of Fig. 1, to an enlarged scale, showing portions of the molding cylinder.

In the molding section, the cylinder 10 (Figs. 2 and 3) comprises a pair of drum-like sections 24 extending lengthwise of the supporting shaft 11 on opposite sides of a central brace member 25. Each of the sections 24 has a hub-like portion 26 keyed to the shaft 11 and radially extending hollow spoke formations 27 so that there are eight hollow spoke formations, which are in axial alignment with each other, providing axially extending passageways 28. The central brace member 25 has a hub-like section 29 which is keyed to the shaft 11 and a solid web section 30 which is formed to provide an end or center barrier terminating the axially extending passageway 28 formed by each of the hollow spoke formations 27 so that the passageways 28 on each side of the brace member 25 are independent of those on the other side. A web formation 31 of substantial thickness extends between the spoke formations 27 at the center of each section 24 and also a substantial distance radially beyond the same with the outer edge forming the periphery of the section. The solid web 30 of the central brace plate 25 extends a substantial distance beyond the periphery of the sections 24, for a purpose which will be described. The two sections 24 on one side of the central brace member (the left side as viewed in Fig. 2) are identical while on the other side the outer one of the sections 24 is somewhat shorter in the direction axially of the shaft 11. An end section 32 is provided which is similar to the sections 24, having a hub portion 33 keyed to the shaft 11, hollow spoke formations 34 in axial alignment with the spoke formations 27 in adjoining section 24 and solid web formations 35 aligned with web formations 31 in adjoining section 24. Sections 24 and 32 and the brace member 25 are held in position by tie rods 36 which extend through the web forming portions 30, 31 and 35. The sections 24 and 32 at opposite ends of the cylinder 10 are provided with end cover plates 37 having apertures 38 aligned with axially extending passageways 28. End plates 37 rotate against the inner faces of stationary suction boxes 39 arranged at the ends of the shaft 11, which will be described. The end plates 37 may also carry an end guard or splash plate 137 which extends into the end of the pulp tank 13.

The hollow interior of each spoke formation 27 is connected by a radial passageway 40 in the web formation 31 extending to the periphery of the latter. Pivot blocks 41 (Fig. 3) are secured by bolts 42 on the periphery of the web formations 31 (Fig. 4) in radial alignment with each of the spoke formations 27. The pivot blocks 41 are of generally T-shaped formation with the stem portion extending radially and the top portion extending in the direction axially of the cylinder 10. The side of the top portion of the pivot block 41 on the end section 24 (Fig. 3) which extends toward the frame side plate 20 (Fig. 2) is recessed at 43 to provide a socket for a relatively short axially extending outer pivot shaft or pin 44. The pivot block 41 on the adjacent section 24 has its top or outer portion reversed in direction, and is recessed to provide a socket for inner pivot pin 44 extending inwardly of cylinder 10 toward center brace member 25. The stem portion of each pivot block 41 and the other side of the top portion are hollow providing a generally L-shaped passageway 45. The passageway 45 extends from the passageway 40 in each spoke 27 to the face of the top portion of the pivot block which extends toward pivot block 41 on the adjacent cylinder section 24 and which is aligned with the corresponding face thereon.

Each pivot pin 44 is received in a bearing 46 in one side of a hollow casting 47 which forms a suction box around the outer end of pivot block 41 and which has its outer face connected to the back or inner side of a supporting or mounting plate 48 by means of bolts 49 (Fig. 4). Plate 48 carries on its face a series of three transverse forming dies 12 which are aligned in the direction axially of the cylinder 10. The suction box casting 47 is provided with a central recess 50 (Fig. 5) which accommodates the outer end of the pivot block 41, with the bearing 46 (Fig. 4) in one end forming wall thereof, sealing the casting in pivotal relation thereon, and with the opposite end wall having an aperture of the same size as the passageway 45 and sealed thereto in pivoted relation by means of a suitable hollow or cylindrical gasket 51 (Fig. 3) which connects the passageway 45 with the passageways 52 formed by the hollow interior of the suction box 47 and with the interior of the forming dies 12 through suitable apertures 53 provided in support plate 48. The pivotal connections between the suction boxes 47 and the pivot blocks 41 permit swinging movement about pivots 44 of each series of three forming dies 12 relative to the cylinder 10, with a continuous passageway for suction, blow-off and drainage, through connecting passageways 38, 28, 40, 45, 52 and 53, from the stationary end suction box 39 to the interior of each die 12.

The suction boxes 47 (Fig. 3) are secured on adjoining cylinder sections 24 and each die support plate 48 extends across and is secured to two boxes 47 tying the same together at their outer periphery so that they pivot as a unit on the pivot pins 44. The cylinder 10 is divided, as shown in Fig. 2, into two halves by the center brace member 25 and each half operates as a unit with the forming dies 12 in transverse groups or series of three on each side, or six across the cylinder, and with separate pulp tanks 13 beneath each half of the cylinder.

Figure 8:
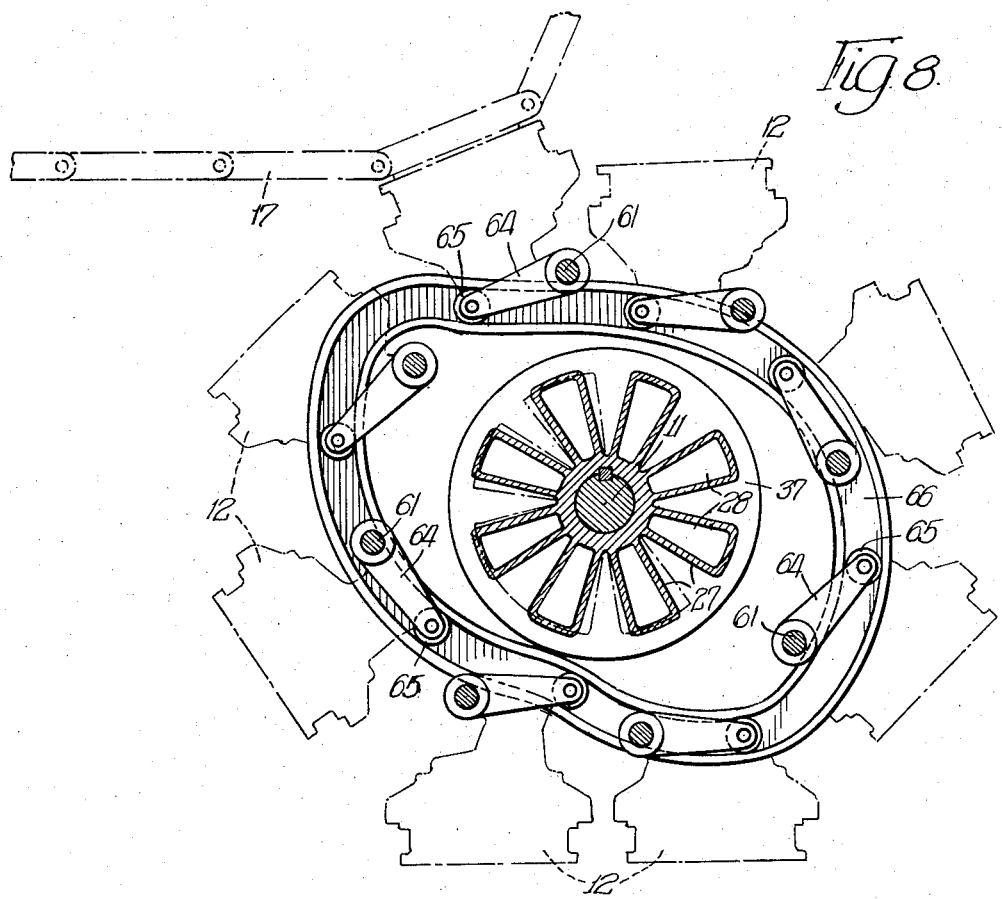
Fig. 8 is a fragmentary detail view on the line 8—8 of Fig. 2.

Each suction box 47 (Figs. 2 and 4) has a casting 54 forming the removable top half of the pivot bearing 46 which is secured to the closed face of the box 47 adjacent one end thereof by bolts 55. A pair of ears 56 extend from the casting 54 towards the cylinder 10 and form a bearing for a pin 57 securing one end of an adjustable link 58 thereto. The other end of the link 58 is pivotally connected by pin 59 with the end of a crank arm 60 which is secured at its other end to a cross shaft 61. The shaft 61, which is mounted in suitable bearings 62 provided in the axially aligned pivot blocks 41 and in the bearing 63 in end section 32, carries at one end a crank arm 64 (Fig. 8) and cam roller 65. The cam roller 65 operates in a fixed cam track 66 to control the pivotal movement of the forming dies 12 about the pivot pins 44 as the cylinder 10 is rotated. The cam track 66 may be secured to a portion 67 of the main frame of the machine in any conventional manner.

The fixed suction boxes 39 (Figs 2 and 7) at the ends of the cylinder 10 provide controlled suction and blow-off connections between the passageways through the cylinder 10 to the interior of the forming dies 12 and suitable vacuum and air pressure supply lines. The end plates 37 of the cylinder 10 each have an inwardly opening peripheral edge groove formation 68 which receives in rotatable sealed relation the outer margin of a circular plate 69 forming one wall of the box 39 which is mounted in fixed relation adjacent the end of the shaft 11, with the shaft 11 extending through a bearing sleeve 70 in the box. The box 39 is partitioned into a plurality of compartments 71, 72, 73, and 74 (Fig. 7) of which 71, 72, and 73 are connected by suitable couplings to suction supply lines 75, 76, and 77, permitting independent control of suction to each compartment. The compartment 74 is connected with a blow-off or pressure line 78 and with a suction line 79. The plate member 69 forming the innermost wall is apertured at 80, 81, 82 and 83 to provide ports for connecting the respective compartments in the box 39 with the passageways 28 in the cylinder 10 as the cylinder revolves. The arrangement of the ports 80, 81, 82 and 83 is such that relatively low or slight vacuum or suction is applied to the forming dies as they enter the vat 13 to begin the molding operation. Increased suction may be applied thereafter until they reach the transfer position where they are blown off the die by air pressure applied through the compartment 74. The timing of the transfer air may be controlled by an auxiliary control valve in the line 78. Separate control valves may be provided in line 75 to further control the timing of the suction application and cut-off.

Each of the forming dies 12 includes a perforated or foraminous screen member 84 (Fig. 4), the outer face thereof being contoured to provide the desired shape of the article to be molded. Such an article may be, for example, an egg carton, which requires a contour including truncated projecting portions 85 separated by relatively deep valleys or recesses 86. The contoured screen member 84 is supported in a box-like frame 87 on a suitably contoured surface having provision for air and water passage which extends outwardly of the supporting plate 48 and the interior of which is in communication with the apertures or ports 53 in the plate 48 which in turn are connected as described with passageway 28 in the cylinder 10.

Figure 1:
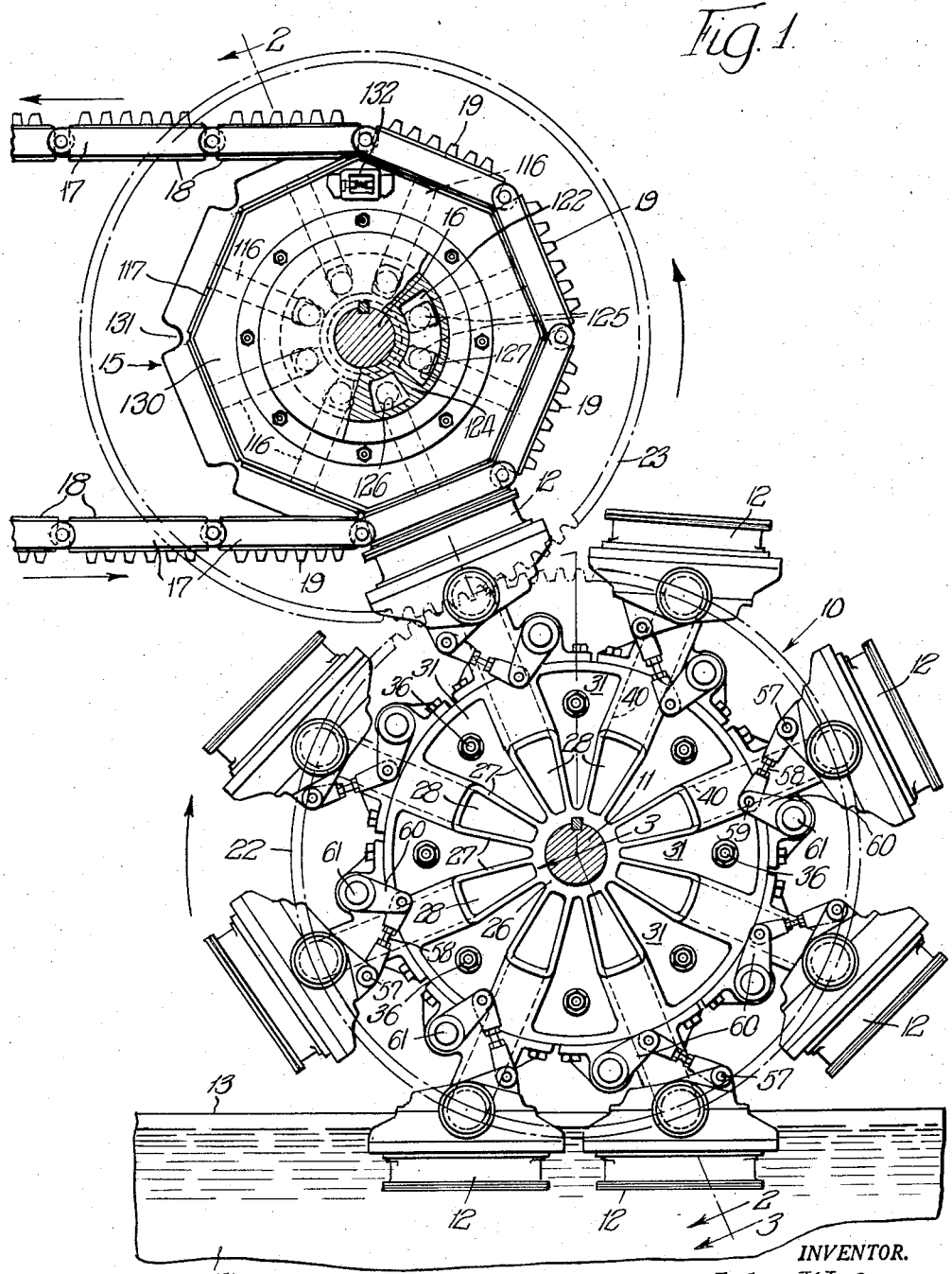
Fig. 1 is a view partly in side elevation and partly in section of molding mechanism which incorporates therein the principal features of the invention.

The drying or supporting forms 19 (Figs. 1, 2 and 11) to which the molded articles are to be transferred are mounted in two groups or series of three, corresponding to the arrangement of the forming dies 12, on carrying frames 18 which are secured in transversely extending relation between corresponding links of the transversely spaced side chains of the conveyor 17. Each of the forms 19 (Fig. 11) is shaped to provide an outer face which will mate with the outer face of the molded pulp on the molding screen 84 of a forming die 12, having projecting portions 89 separated by recesses 90 which are complementary to the recesses 86 and projecting portions 85 of the screen member 84. The construction is such as to permit formation and transfer to the rigid drying forms 19 of articles of as great an angle as 15° and depth as much as 3 inches or more. The form carrying frames 18 are of relatively shallow box-like formation having an outer wall member 91 on which the forms 19 are mounted, the wall 19 being apertured at 92 to provide for the passage of air from the hollow interior of the frame to the inner face of each form 19. The inner wall of the carrying frame 18 is provided with a relatively large aperture 93 on each side of the center brace member 111.

Figure 9:
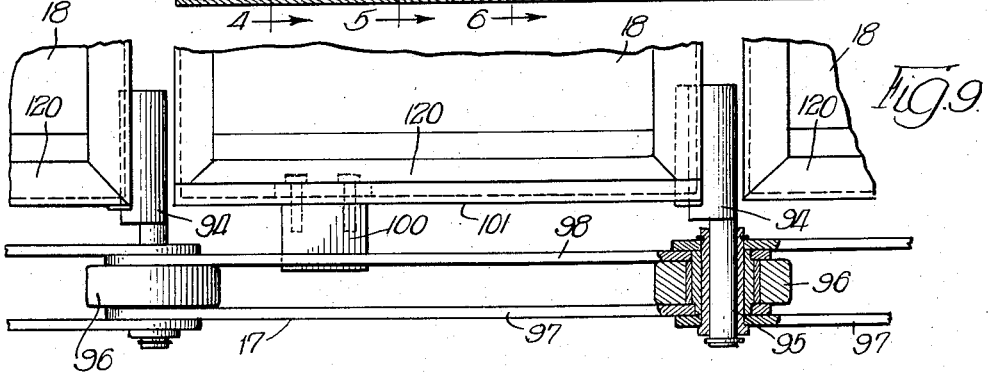
Fig. 9 is a detail view taken on the line 9—9 of Fig. 2, to an enlarged scale.
Figure 10:
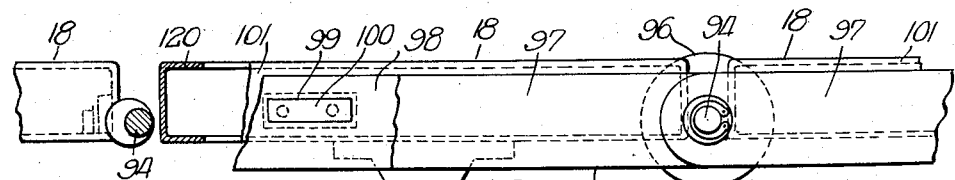
Fig. 10 is a detail view taken on the line 10—10 of Fig. 2, to an enlarged scale and with portions broken away.

Each form carrying frame 18 (Figs. 9, 10 and 11) is provided at the corners of its forward or leading edge with mounting or support members 94, the outer ends of which are slidably mounted in bearing sleeves 95 which form part of the pivot formation 96 connecting successive double plate links 97 and 98 on the conveyor side chains. The inner link plate 98 is apertured at 99 to receive the outer end of a slide block 100 which is secured to and projects outwardly of the end wall 101 of the frame 18. The frame 18 and its drying forms 19 are thus mounted on the supporting chain links so that the frame 18 is free to slide, to a limited extent, across the machine for transverse registration of the drying forms 19 with forming dies 12 with which they mate during the transfer operation.

To overcome any unequal forward movement of the chains and to insure alignment of the drying forms 19 with the forming dies 12 in the direction of travel, each frame 18 has on its outer face adjacent the end a male centering member 102 which is adapted to be received in a cooperating female member 103 on the end of the die supporting plate 48, the female member 103 having a beveled opening 104.

Each frame 18 (Figs. 11 to 13) is provided at its center with an outwardly projecting centering plate 105, secured thereto by angle brackets 106, and the center plate member 25 on the cylinder 10 is provided with circumferentially spaced pairs of transversely spaced plates 107 secured thereto by bracket plates 108 which cooperate to form female or socket members for receiving the plate members 105. These transverse centering members are arranged so that when a frame 18 carrying a transverse series of forms 19 moves onto the periphery of the sprocket formation 15 and a mating transverse series of dies 12 moves opposite thereto, with the forms and dies moving into close parallel relation, the forms will be guided into positive alignment with the opposed dies and there will be no misalignment transversely due to side sway of the chains and the effects of expansion of the frame due to heat from the drying oven will be distributed on both sides of the machine.

The sprocket formation or conveyor end support 15 (Figs. 1, 2 and 3) comprises end members 110, a central brace or support member 111, and hub forming members 112 which extend along the shaft 16 from the center brace member 111 to the hub forming portions 113 of the end members 110. The end members 110, center brace member 111 and the intermediate hub members 112 are all splined to the shaft 16. The hub members 112 are provided with circumferentially spaced axially extending compartments or passageways 114 and the hub portions 113 of the end members 110 are provided with corresponding compartments or passageways 115 in axial alignment which form continuous passageways from the end members 110 to radially extending pipes 116, the latter being connected at their outer ends to transversely extending peripherally spaced rectangular plate members 117. The plate members 117 extend between the periphery of center brace member 111 and the periphery of the end members 110 and are arranged around the sprocket formation to form closures for the apertures 93 in the chain carried frames 18 when the latter move around the sprocket. Each plate member 117 carries a compressible sealing gasket 119 (Fig. 11) which is positioned to engage the flange-like edge 120 of the inner wall of the carrying frame 18 around the opening 93 so that, as the frames 18 move around the sprocket formations 15, the inner wall of each frame 18 is closed by the plate members 117 which form with the frame 18 a suction box for the application of suction to the drawing forms 19 carried on the outer wall 91 of the same. Compressible sealing gaskets 121 may also be provided on the edges of the forms 19 to seal between the forms 19 and the dies 12.

Each sprocket end member 110 (Fig. 2) has secured on its outer face a central plate 122 having a peripheral groove formation 123 which receives an edge or flange on the inner wall of a suction box 124. The plate 122 is apertured at 125 corresponding to the ends of the passageways 115 in the end member 110. The suction box 124 is provided with compartments or passageways 126 and 127 (Fig. 1) which are connected by suitable pipe lines 128 (Fig. 2) to a suction device. The suction boxes 124 are fixed to the main frame in any conventional manner and the shaft 16 rotates in bearing sleeves 129 provided therein. The passageways 126 and 127 are arranged to provide suction at the time of the transfer of the pulp articles from the dies 12 to the forms 19 and for a predetermined portion of the movement of the forms 19 upwardly around the sprocket formation 15.

Sprocket plates 130 (Fig. 2) are secured to the outer faces of the end members 110 adjacent the peripheral margins which have peripherally spaced socket formations 131 (Fig. 1) for receiving the link connecting pivots 96 (Fig. 9) on the conveyor chains 17. The plates 130 and end members 110 are provided with adjusting mechanisms 132 (Fig. 1) to permit proper aligning of the plates 117 and the frames 18. Transversely extending tie bolts 133 (Fig. 2) secure the sprocket forming members rigidly together when they are properly aligned on the shaft 16.

The sprocket shaft 16 and molding cylinder shaft 11 are arranged in parallel relation with shaft 11 spaced below and forwardly or ahead of shaft 16, in the longitudinal direction of the machine, a sufficient distance to permit the pivots 96 at both ends of the chain link at each end of a drying frame to be engaged in sockets 131 to rigidly hold the drying frame carried by the link relative to the sprocket as the forms on the frame move into parallel spaced relation with the dies on the molding cylinder for transfer of the articles. The pivot points 44 of forming dies 12 are located in the pitch line of the gears 22 and 23 which connect the sprockets and the molding cylinder in driving relation. The relative arrangement of the members is such that the dies 12 are pivoted at a point where radii struck from the centers of the shafts of the sprockets and the forming unit multiplied by their respective r.p.m. produce an equal number, the molding dies being movable through spaced parallel transfer relation with the drying forms as the radii are aligned through the pivot point of the dies and the molded article being jumped across from the forming die to the drying form at this point. The chain links carrying the drying form being engaged at both ends with the sprockets, the sprockets impart the greatest rigidity on the frame carried by the links due to initial pull of the sprockets on the chains as the chain links move forward into engagement with the sprockets.

Figure 19:
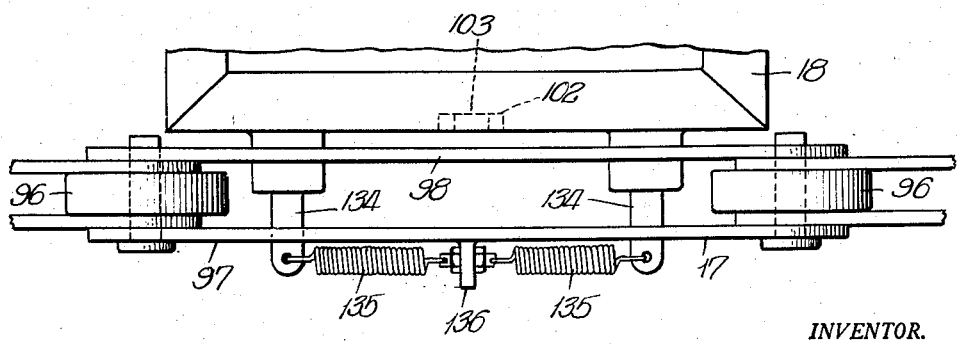
Fig. 19 is a detail view similar to Fig. 9 showing a modification.

Referring to Fig. 19, there is shown a modified arrangement to insure alignment between the faces of the dies 12 and the forms 19 as they are moved into close proximity. The cross frames 18 are provided at their ends with spaced brackets 134 which extend through apertures in the double plate links 97, 98 and are connected by springs 135 with a central bracket 136 on the outer face of the outer plate 97 so that the frames have sufficient movement for centering at each end to compensate for uneven chain movement. The centering may be accomplished by providing male and female members 102 and 103 on the frames 18 and the die support plates 48 as previously described.

It is desirable to mount the sprocket formation 15 so that it can be readily moved out of or into proper position relative to the molding cylinder 10. In Figs. 20 and 21 bearing supporting frames 150 are provided on the main frame plates 20 and 21 each of which has a central guideway 151 for the bearing block 152, the latter being arranged to move in the guideway 151. The guideway is curved to prevent undesirable tension in the conveyor chains 17. The bearing block 152 is mounted in a two-piece hanger or sling 153 which is pivotally connected at 154 to a vertical member 155 which is slidable in a sleeve 156 in a top frame 157. The upper end of the member 155 is threaded and received in an internally threaded vertical lifting sleeve 158 which is mounted in a bearing 159 and carries on its upper end a bevel gear 160. The bevel gear 160 is driven by a second bevel gear 161 mounted on a transverse shaft 162 which is supported adjacent each end in a bearing 163 on the upper end of bracket 164. The transverse shaft 162 carries at one end a sprocket 165 which is driven by chain 166 extending forwardly from driven gear 167 of the speed reducer 168 which is in turn driven by motor 169. The shaft 162 extends between the lift mechanisms at opposite ends of the shaft 16 and rotation of the same by operation of the motor 169 through the reducer 168, gear 167 and drive chain 166 causes the bearing blocks 152 to be lifted simultaneously and equally. The bearing blocks 152 may be provided with downwardly extending brackets 170 and bolts 171 for securing the same in rigid relation to the support frame 150.

In operation, the cylinder 10 (Fig. 2) and the conveyor 17 are driven by a common source of power through the connecting drive gears 22 and 23 on the shafts 11 and 16 of the cylinder 10 and the sprocket formation 15. The direction of motion is indicated by arrows in Fig. 1 and the sprocket 15 and cylinder 10 are timed to bring each transverse series of dies 12 into opposed relation with successive series of drying forms 19 on the conveyor 17 as the lower run of the conveyor 17 moves around the sprocket 15. The dies 12 are controlled in their movement about the pivot pins 44 by cam 66 to bring the faces of the same into parallel relation with the surface of the liquid pulp material 14 as the molding screen 84 moves into the material 14 with sufficient suction being applied to start the accumulation of the layer of pulp fibers on the face of the screen. Increased suction is applied as the screen moves through the material 14 and the thickness of the layer of pulp fibers increases. The screen is maintained by the cam control in parallel relation with the surface of the material 14 as it moves out of the same so that the deposit of the fibers due to the suction is substantially uniform on all areas and wedge effects are prevented. This results in a more positive control of the thickness of the pulp layer. Provision is made, of course, in the suction lines for draining the suction passages of the liquid drawn through the forming dies 12 as the pulp is deposited, and for further extraction of water from the pulp as the dies move toward the drying forms 19. The conveyor end sprocket 15 and the molding cylinder 10 are arranged with their supporting shafts 16 and 11 parallel and in a common plane, the shaft 11 being spaced below and ahead of the shaft 16 so that the oncoming chain links, carrying each frame 18, are fully engaged and held rigid on the sprockets as the complementary faces of the dies 12 and forms 19 move into mating relation for transfer of the articles. As each transverse series of dies 12 approaches the lower run of conveyor 17 the cam 66 tilts or rotates the dies about pivots 44 to bring the faces of the dies into parallel relation with the faces of the forms 19 on the oncoming carrier frame 18 without interference between the projecting portions of the dies and forms. The die carrying plate 48 is rotated (Figs. 14 to 18) by the cam control to bring the complementary faces of the dies 12 and the forms 19 into parallel spaced relation just prior to their closest approach to each other, which occurs as they reach the line 140 (Fig. 16) connecting the centers of rotation of shafts 11 and 16, and to hold them in parallelism as they move along a predetermined portion of their respective paths. The cam track 66 is constructed to pivot the dies 12 about the pivot pins 44 so that the movement of the face of each die 12 relative to the face of a form 19 changes from the angular approach to Fig. 14 to the parallel approach of Fig. 15 which is held until the members pass through their closest position at Fig. 16 and reach the position of Fig. 17 where separation with relative angular movement begins and increases as the members reach the position of Fig. 18. The complementary faces of the members move toward each other while held in parallel relation as they approach and move past the line 140 so that they are closely spaced but not in engagement for a distance sufficient to jump the articles from the dies 12 to the forms 19 by means of air pressure applied to the interior of the dies 12 and suction applied to the interior of the forms 19. The tilting or pivotal movement of the dies 12 which results in the parallel approach of the complementary faces of the dies 12 and forms 19 together with the longitudinal centering devices on the die support plates 48 and frames 18 and the transverse centering devices on the frames 18 and center brace member 25, prevents the projecting portions 85 and 89 on the dies 12 and forms 19 from contacting each other or interfering with the mating of the same so that there is no scuffing or other damage to the soft and wet pulp layer in the course of its transfer. The pulp is transferred while the complementary faces of the die and drying form are in parallel relation and closely spaced relative to each other. The transfer is accomplished with the dies and the forms traveling at full speed and without any interference by either the dies or forms with each other or with the pulp article.

The arrangement of the forming dies and drying forms transversely of the machine provides multiple unit production on a single machine while dividing the units across the machine and providing separate stock tanks permits the use of different stock in the tanks and the production of different cartons simultaneously on a single machine.

While specific details of construction have been referred to in describing the illustrated forms of the apparatus, it will be understood that other details of construction may be resorted to within the scope of the invention.

I claim:

1. In a pulp molding machine, a rotary forming wheel, a plurality of forming dies peripherally spaced about said wheel, said forming dies being arranged in transverse series with each series divided into at least two transversely spaced sets, each set of said dies being mounted to pivot as a unit on the wheel, a plurality of transversely spaced vats adapted to receive a supply of liquid pulp material, each of said vats being positioned to receive successive sets of forming dies for a sufficient portion of the movement of the wheel to permit deposit of a layer of pulp thereon, an endless drying form conveyor, said conveyor comprising side chains spaced transversely of the machine and supported at one end on transversely spaced sprockets having their axis of rotation located above and rearwardly with respect to the direction of rotation and of the axis of rotation of said forming wheel, said side chains having relatively long links, rigid cross frames extending between corresponding side chain links, drying forms mounted on said cross frames in transversely spaced arrangement corresponding to the transverse arrangement of the forming dies, said cross frames having means at each end connecting the same in transverse sliding engagement with the side chain links, cam means for pivoting each transverse series of dies into closely spaced opposed parallel relation with the drying forms on a cross frame as successive cross frames move from the lower run of the conveyor upwardly about the end supporting sprockets, said cam means also serving to pivot the dies into a plane parallel with the surface of the pulp material in the vats while the dies move into and through said material, and means for centering each cross frame transversely of the machine as the drying forms thereon move into mating relation with the transverse series of forming dies.

2. In a pulp molding machine, a rotary forming wheel, a plurality of pivotally mounted forming dies peripherally spaced about said wheel, said forming dies being arranged in transverse series with each series divided in the middle of the wheel to provide two transversely spaced sets thereof, the set of said dies on each side of the wheel in each series being mounted to pivot as a unit on the wheel, a pair of transversely spaced vats each adapted to receive a supply of liquid pulp material, each of said vats being positioned so that successive sets of forming dies on one side of the wheel pass therethrough to permit a layer of pulp to be deposited on said dies, an endless drying form conveyor, said conveyor comprising side chains spaced transversely of the machine and supported at one end on transversely spaced sprockets, said sprockets having their axis of rotation located above and rearwardly with respect to the direction of rotation and of the axis of rotation of said forming wheel, said side chains having relatively long links, rigid cross frames extending between corresponding side chain links, drying forms mounted on said cross frames in transversely spaced arrangement corresponding to the transverse arrangement of the forming dies, said cross frames having longitudinally spaced transversely extending members at each end connecting said cross frames in transverse sliding engagement with the side chain links, cam means for pivoting each transverse series of dies into closely spaced opposed parallel relation with the drying forms on a cross frame as successive cross frames move from the lower run of the drying form conveyor upwardly about the end supporting sprockets, said cam means also serving to pivot the dies into a plane parallel with the surface of the pulp material in the vats while the dies move into and through said material, and cooperating means on the forming wheel and the cross frames for centering each cross frame transversely of the machine as the drying forms thereon move into mating relation with the transverse series of forming dies.

3. In a pulp molding machine, a container for receiving a supply of liquid pulp material therein, a hollow drum rotatably mounted above said container, a hollow forming die having a molding face characterized by projecting portions separated by recesses of substantial depth, said die being pivotally mounted on said drum, non-flexible means connecting the interior of the drum and forming die through the pivotal mounting thereof with a suction member, means to control the movement of said forming die about its pivotal mounting, said drum being so arranged relative to the container that the molding face of said die is moved into and out of the pulp material by rotation of said drum and said face is pivoted by said control means relative to said drum and into a plane generally parallel to the surface of said pulp material while it is moved by the drum through the pulp material to permit formation of a pulp article thereon by suction through said molding face, an elongate endless drying conveyor having a supporting frame thereon, said supporting frame having an article receiving face characterized by projecting portions and recesses adapted to mate with said molding face, said conveyor being arranged with the leading end of the lower run supported on a member rotatable about a fixed axis adjacent said drum whereby said supporting frame is adapted to be moved into opposed relation with said forming die when said supporting frame moves upwardly around the rotatable member and said forming die is carried around by the drum to a point between said drum and said rotatable member, the means to control the movement of said forming die being arranged to pivot the forming die relative to the supporting frame to bring said mating faces into closely spaced aligned relation and to hold said faces in such relation for a predetermined period when said forming die and supporting frame are in opposed relation, and suction means mounted on said rotatable member for applying suction to the rear face of the frame as it is carried therearound on the conveyor to transfer a molded pulp article from the forming die to said frame.

4. In a pulp molding machine, a container for receiving a supply of liquid pulp material therein, a continuously rotating cylinder mounted above said container, a forming die pivotally mounted on said cylinder and having a foraminous outwardly facing molding surface, a crank arm and cam roller connected to said forming die and a fixed cam track associated with said cylinder for controlling the pivotal movement of said die relative to said cylinder as it travels in a circular path, an elongate continuously moving endless conveyor arranged on spaced end supports and located relative to said cylinder so that the lower run thereof approaches in a curved path about one of said end supports adjacent the top of said cylinder, a supporting form on said conveyor and having an outwardly facing surface complementary to said molding surface, means for synchronizing the movement of said cylinder and said conveyor to bring said complementary surfaces of said forming die and said supporting form into opposed spaced relation as said die and form approach each other, said cam track being arranged to pivot said forming die to bring the molding surface thereof into a plane generally parallel to the complementary surface on said supporting form and for holding said surfaces in parallel relation for a period extending through their point of closest approach to each other, and cooperating means on said conveyor and said cylinder for aligning said complementary surfaces when they are brought into parallel relation, said cam track also being arranged to pivot the forming die as it enters and moves through the pulp material in said container so that the forming face of the die is maintained parallel to the surface of the pulp material during its entrance and movement therethrough.

5. In a molding machine, transversely spaced containers for liquid pulp material, a cylinder rotatably mounted on a transverse shaft above said containers and having pivotally mounted thereon peripherally spaced transverse series of forming dies, said dies being spaced transversely to correspond with the spacing of said containers and having molding faces which are immersed in the pulp material in the containers during a portion of the rotational movement of the cylinder, a pair of spaced sprockets mounted on a transverse shaft above said cylinder and rearwardly thereof relative to the rotation of said cylinder, a conveyor comprising transversely spaced chains having relatively long links supported at one end on said sprockets, successive rigid frames of less length than the chain links extending between corresponding chain links on opposite sides of the conveyor, said frames having a transverse series of article supporting forms thereon with faces complementary to said molding faces, said forms being spaced transversely to correspond with the spacing of said dies, means for rotating said cylinder and said sprockets in opposite direction and in timed relation to bring a series of said dies into opposed relation with a series of said forms, means for controlling the pivoting of said series of dies to bring the complementary faces of said dies and said forms into parallel relation as they approach and pass through a line connecting the center of rotation of said cylinder and said sprockets, cooperating means to positively align said dies and said forms transversely and longitudinally when they are in closely spaced opposed parallel relation for transfer of articles from the dies to the forms, and suction means mounted between the sprockets and adapted to cooperate with the rear of the succesive forms being carried around the sprockets on the conveyor for applying suction to transfer the molded pulp articles from the forming dies to the supporting forms on the chain.

6. In a pulp molding machine, a continuously moving conveyor comprising transversely spaced side chains having relatively long links, rigid hollow compartment forming frames extending between corresponding links of said side chains, said frames having a transverse series of porous article receiving forms arranged on the outer face thereof and an aperture in the inner face, a sprocket formation for supporting one end of the conveyor, said sprocket formation comprising transversely spaced end plate members having peripheral teeth for engaging the chain links, a rigid transverse frame connecting said end plate members and having peripherally spaced transversely extending plate members arranged to cooperate with the inner faces of said form supporting frames and close the apertures therein as the supporting frames move upwardly around the sprocket formation and the chain links supporting the forms are engaged by the teeth on the end plate members, means forming a connecting passageway from the hollow form supporting frames to the end plate members and a fixed suction box at each end of the sprocket formation providing controlled suction for application through the connecting passageways to the forms, a continuously rotating molding cylinder arranged forwardly of and below said sprocket formation, peripherally spaced molding dies pivotally mounted on said cylinder and arranged in transverse series corresponding to the transverse series of forms, means to control the pivoting of each series of said dies relative to said cylinder as they move between the conveyor sprocket formation and the molding cylinder to bring the faces of the dies into parallel spaced relation with supporting forms on the conveyor and means to register the dies and forms transversely and in the direction of travel.

7. A molding machine for fabrication of articles from paper pulp, comprising a pulp tank adapted to contain a supply of liquid pulp material, a rotary molding wheel positioned above said pulp tank and having peripherally spaced molding dies pivotally mounted thereon, an endless drying conveyor having the lower run thereof advancing upwardly and around end supporting sprockets positioned above and rearwardly relative to the direction of rotation of said molding wheel, said drying conveyor having transversely spaced side chains, rigid cross frames supported between corresponding links of said chains and drying forms on said frames which are adapted to mate with the molding dies, means for continuously rotating said molding wheel and for advancing said drying conveyor in synchronized relation to bring the dies into opposed spaced relation with successive drying forms, and cam means associated with the wheel for pivoting said dies relative to the molding wheel to control the position of said dies in the lower portion of their orbit so as to maintain the dies parallel to the surface of the liquid pulp material as they successively enter and as they pass through the pulp tank and to control the position of said dies in the upper portion of their orbit and bring the same into parallel spaced mating relation with the drying forms as they move into opposed relation.

8. In a pulp molding machine, a container for a supply of liquid pulp material, a continuously rotating cylinder mounted above said container, a forming die pivotally mounted on said cylinder and having an outwardly facing molding surface, a crank arm and cam roller connected to said forming die, a fixed cam track associated with said cylinder for engaging the cam roller to control the pivotal movement of said forming die relative to said cylinder as it travels in a circular path, a continuously moving endless drying conveyor on spaced end supports and arranged relative to said cylinder so that the lower return run is moving in an upwardly curved path about one of said end supports as it approaches adjacent the top of said cylinder, a frame on said conveyor having an outwardly facing form complementary to said molding surface, means to hold said frame rigid relative to said conveyor, and means for controlling the movement of said conveyor relative to said cylinder to advance said frame into opposed relation with said forming die as it moves into said curved path, said cam track being arranged to pivot said forming die relative to said cylinder to bring the molding surface thereon into a plane generally parallel to and spaced from the complementary form on said drying frame, for a predetermined period of parallel movement thereof and also to pivot said die as it enters and moves through the pulp material in said container so that the forming face of the die is maintained parallel to the surface of the pulp material during its entrance and movement therethrough.

9. In a molding machine having a rotatable molding cylinder with peripherally spaced molding dies thereon, and an elongate endless conveyor with article supporting forms spaced thereon, and with a rotatable end sprocket formation for said conveyor mounted on a transverse shaft above and rearwardly relative to the direction of rotation of said cylinder whereby when said cylinder and said sprocket formation are rotated in timed relation successive molding dies and supporting forms are moved into opposed relation for transfer of articles from the molding dies to the supporting forms, means for movably supporting said sprocket shaft comprising transversely spaced frames having transversely aligned generally vertical guideways for receiving in sliding relation therein bearings for said shaft, said guideways being curved to relieve the tension in said conveyor when said bearings are moved upwardly from their normal operating position, rotatable members pivotally connected to said bearings for moving said bearings in said guideways whereby to move said conveyor away from said cylinder, and motor driven means for operating said rotatable members simultaneously.

10. A molding machine for fabrication of articles from paper pulp, comprising a pulp tank adapted to contain liquid pulp material, a rotary molding wheel positioned above said pulp tank, a series of molding dies mounted on transversely extending peripherally spaced pivot formations on said molding wheel, an elongate endless drying conveyor having transversely spaced side chains, a pair of sprockets supporting one end of said conveyor on an axis which is positioned above said molding wheel and to the rear of the axis of said molding wheel relative to the direction of rotation thereof, a series of drying forms supported on said conveyor chains and having faces which are adapted to mate with the faces on the molding dies, means connecting the molding wheel and the sprockets for continuous rotation thereof in timed relation to bring the molding dies and drying forms into opposed spaced relation as the drying forms approach and move upwardly around said sprockets and away from the molding wheel and as the molding dies approach and move through the top portion of their path, a fixed cam member associated with the wheel, and cooperating control members between said fixed cam member and said molding dies arranged to swing said molding dies on their pivot formations to decrease the angle of approach and separation of the mating faces of the molding dies and the drying forms and to maintain said faces in spaced parallel relation during their movement in the portions of their respective paths in which they are in opposed relation and in closest proximity to each other, said cam and cooperating control members also pivoting the dies to maintain their faces parallel with the surface of the liquid pulp material as they successively enter and move therethrough.

11. A pulp molding machine comprising a tank adapted to contain a dilute water-fiber mixture, a forming die carrier wheel mounted for continuous rotation about an axis above said tank, a plurality of spaced forming dies mounted on said carrier wheel, each of said dies including a foraminous plate having an outer face shaped to conform to one face of the article produced upon which face fibers are felted upon application of reduced pressure to its opposite face, and being pivotally mounted on said carrier wheel to pass through said mixture, and having a cam lever effective to pivot said die and a cam follower carried by said cam lever, a plurality of dehydrating dies each including a foraminous plate having an outer face shaped to conform to the other face of the article produced to receive said layer of felted fibers from said forming dies, a dehydrating die conveyor carrying said plurality of dehydrating dies and continuously movable in the same direction as said forming dies to move the outer face of a dehydrating die into mating relation with the outer face of a forming die, a fixed cam track acting upon said cam followers to pivot and maintain said forming dies angularly about their pivots with their outer faces generally alined with the surface of said mixture while passing therethrough and to pivot and maintain said forming dies generally alined with said dehydrating dies when in mating relation therewith, a suction member carrier mounted for continuous movement in the same direction as said forming and dehydrating dies, a plurality of suction members mounted on said suction member carrier each of said suction members being adapted to engage the rear face of a hydrating die while said dehydrating die is maintained in mating relation with a forming die, means for producing a reduced pressure on said forming die opposite face while said die is passing through said mixture to produce a substantially uniform layer of felted fiber on said outer face and for ejecting said layer when a forming die is in mating relation with a dehydrating die, and means for producing a reduced pressure on said suction member while said member is in engagement with said dehydrating die to transfer said felted fibers from said forming die to said dehydrating die.

12. A pulp molding machine comprising a tank adapted to contain a dilute water-fiber mixture, a forming die carrier wheel mounted for continuous rotation about a fixed axis above said tank, a plurality of spaced forming dies mounted on said carrier wheel, each of said dies including a foraminous plate having an outer face shaped to conform to one face of the article produced upon which face fibers are felted upon application of reduced pressure to its opposite face, and being pivotally mounted on said carrier wheel to pass through said mixture, and having a cam lever effective to pivot said die and a cam follower carried by said cam lever, a plurality of dehydrating dies each including a foraminous plate having an outer face shaped to conform to the other face of the article produced to receive said layer of felted fibers from said forming dies, a dehydrating die chain conveyor carrying said plurality of dehydrating dies and continuously movable in the same direction as said forming dies to move the outer face of a dehydrating die into mating relation with the outer face of a forming die, a fixed cam track acting upon said cam followers to pivot and maintain said forming dies angularly about their pivots with their outer faces generally alined with the surface of said mixture while passing therethrough and to pivot and maintain said forming dies generally alined with said dehydrating dies when in mating relation therewith, a suction member carrier mounted for continuous movement in the same direction as said forming and dehydrating dies, a plurality of suction members being adapted to engage the rear face of a dehydrating die while said dehydrating die is maintained in mating relation with a forming die, means for producing a reduced pressure on said forming die opposite face while stantially uniform layer of felted fiber on said outer face and for ejecting said layer when a forming die is in mating relation with a dehydrating die, and means for producing a reduced pressure on said suction member while said member is in engagement with said dehydrating die to transfer said felted fibers from said forming die to said dehydrating die.

13. A pulp molding machine comprising a tank adapted to contain a dilute water-fiber mixture, a forming die carrier wheel mounted for continuous rotation about a fixed axis above said tank, a plurality of spaced forming dies mounted on said carrier wheel, each of said dies including a foraminous plate having an outer face shaped to conform to one face of the article produced upon which face fibers are felted upon application of reduced pressure to its opposite face, and being pivotally mounted on said carrier wheel to pass through said mixture, and having a cam lever effective to pivot said die and a cam follower carried by said cam lever, a plurality of dehydrating dies each including a foraminous plate having an outer face shaped to conform to the other face of the article produced to receive said layer of felted fibers from said forming dies, a chain conveyor carrying said plurality of dehydrating dies and continuously movable in the same direction as said forming dies to move the outer face of a dehydrating die into mating relation with the outer face of a forming die, a fixed cam track acting upon said cam followers to pivot and maintain said forming dies angularly about their pivots with their outer faces generally alined with the surface of said mixture while passing therethrough and to pivot and maintain said forming dies generally alined with said dehydrating dies when in mating relation therewith, a suction member carrier wheel supporting and guiding said chain conveyor and mounted for continuous rotation about an adjustably fixed axis spaced from said forming die carrier wheel axis in the same direction as said forming and dehydrating dies, a plurality of suction members mounted on said suction member carrier wheel each of said suction members being adapted to engage the rear face of a dehydrating die while said die is maintained in mating relation with a forming die, means for producing a reducing pressure on said forming die opposite face while die is passing through said mixture to produce a substantially uniform layer of felted fiber on said outer face and for ejecting said layer when a forming die is in mating relation with a dehydrating die, and means for producing a reduced pressure on said suction member while said member is in engagement with said dehydrating die to transfer said felted fibers from said forming die to said dehydrating die.

14. A pulp molding machine comprising a tank adapted to contain a dilute water-fiber mixture, a forming die carrier wheel mounted for rotation about a fixed axis above said tank, a forming die including a foraminous plate having an outer face shaped to conform to one face of the article produced upon which face fibers are felted upon application of reduced pressure to its opposite face, said forming die being pivotally mounted on said carrier to pass through said mixture and having a cam lever effective to pivot said die, and a cam follower carried on said lever, means for producing a reduced pressure on said opposite face while said die is passing though said mixture to produce a substantially uniform layer of felted fiber on said outer face, a dehydrating die including a foraminous plate having an outer face shaped to conform to the other face of the article produced to receive said layer of felted fibers from said forming die, a conveyor carrying said dehydrating die and movable in the same direction as said forming die to move the outer face of said dehydrating die into mating relation with the outer face of said forming die, a fixed cam track acting upon said cam follower to pivot and maintain said forming die angularly about its pivot with its outer face generally alined with the surface of said mixture while said outer face passes through said mixture and to maintain said forming die in mating relation with said dehydrating die, means for continuously rotating said forming die carrier wheel and continuously moving said dehydrating die conveyor in synchronism therewith, and means for producing a reduced pressure on said dehydrating die when in engagement with said forming die to transfer said felted fibers from said forming die to said dehydrating die.

References Cited in the file of this patent

UNITED STATES PATENTS

| Number | Name | Date |
|---|---|---|
| 244,156 | Adams | July 12, 1881 |
| 558,676 | Cunningham et al. | Apr. 21, 1896 |
| 762,211 | Stuart | June 7, 1904 |
| 924,721 | Arbuckle | June 15, 1909 |
| 1,179,840 | Kelleher | Apr. 18, 1916 |
| 1,261,902 | Brown | Apr. 9, 1918 |
| 1,300,677 | Waterman | Apr. 15, 1919 |
| 1,494,345 | Eaid | May 20, 1924 |
| 1,618,289 | Koppelman | Feb. 22, 1927 |
| 1,719,819 | Koppelman | July 2, 1929 |
| 1,809,852 | Jay | June 16, 1931 |
| 1,845,831 | Chaplin | Feb. 16, 1932 |
| 1,967,361 | Healy | July 24, 1934 |
| 2,163,585 | Chaplin | June 27, 1939 |
| 2,165,364 | Ferngren | July 11, 1939 |
| 2,559,945 | Chaplin | July 10, 1951 |